(12) United States Patent
Wubben et al.

(10) Patent No.: US 7,168,717 B2
(45) Date of Patent: Jan. 30, 2007

(54) HIGH CLEARANCE VEHICLE SUSPENSION WITH TWIN SPINDLES FOR TRANSFERRING STEERING TORQUE

(75) Inventors: Thomas Mark Wubben, Ankeny, IA (US); Marvin Anthony Maiwald, Ankeny, IA (US); Brandon Cy Carlson, Ankeny, IA (US); Jack Conan Anderson, Madrid, IA (US); William Allen Brett, Polk City, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/046,310

(22) Filed: Jan. 28, 2005

(65) Prior Publication Data

US 2006/0170176 A1    Aug. 3, 2006

(51) Int. Cl.
*B60G 3/01*       (2006.01)
(52) U.S. Cl. .................. 280/124.127; 280/93.502; 280/93.51; 280/124.157; 280/124.154
(58) Field of Classification Search ......... 280/124.127, 280/124.154, 124.155, 124.157, 92, 93.502, 280/93.505
See application file for complete search history.

(56) References Cited

U.S. PATENT DOCUMENTS

| | | | | |
|---|---|---|---|---|
| 2,220,254 A | * | 11/1940 | Maier | .................. 280/86.751 |
| 3,604,725 A | * | 9/1971 | Goff et al. | ................ 280/6.158 |
| 5,597,172 A | | 1/1997 | Maiwald et al. | ............ 280/672 |
| 5,836,399 A | * | 11/1998 | Maiwald et al. | ............ 172/509 |
| 6,371,237 B1 | | 4/2002 | Schaffer | ..................... 180/253 |
| 6,406,043 B1 | * | 6/2002 | Balmer | .................... 280/124.1 |
| 6,491,306 B2 | | 12/2002 | Schaffer | .................. 180/5.502 |
| 2002/0053795 A1 | | 5/2002 | Schaffer | |

FOREIGN PATENT DOCUMENTS

GB          222 109 A       12/1924

* cited by examiner

*Primary Examiner*—Paul N. Dickson
*Assistant Examiner*—George D Spisich

(57) ABSTRACT

An independent strut suspension utilizes upright twin spindles and a spindle cap linked to the spindles that translates vertically along the spindles as the suspension moves over uneven terrain. An upright strut shaft is mounted in a strut journal for axial and rotational movement with respect to the journal. A steering arm is connected for rotation about the strut shaft axis, and the strut shaft moves axially with respect to the steering arm as the frame moves over the uneven terrain. The upright spindles connect the steering arm and the upper mount, and a spring is supported between the upper end of the strut shaft and the upper mount and provides cushioning for the wheel support as the strut shaft moves axially in the journal.

8 Claims, 4 Drawing Sheets

HIGH CLEARANCE VEHICLE SUSPENSION WITH TWIN SPINDLES FOR TRANSFERRING STEERING TORQUE

FIELD OF THE INVENTION

The present invention relates generally to agricultural high clearance vehicles and, more specifically, to suspension and steering systems for implements such as self-propelled sprayers.

BACKGROUND OF THE INVENTION

Suspensions for high clearance agricultural vehicles such as the John Deere 4720 Sprayer utilize a linkage to translate torque from a steering cylinder input to the suspension spindle. Such a linkage is shown, for example, in commonly assigned U.S. Pat. No. 5,597,172 and includes a pneumatic spring supported above a strut shaft which is received within a strut journal connected to an adjustable axle. A scissors assembly located above the axle maintains wheel steer while facilitating vertical movement of the strut shaft within the journal. On non-steerable wheels, the lower end of the scissors assembly is connected to the journal to maintain a preselected wheel orientation. For steerable wheels, the lower end of the scissors assembly is connected to a hydraulic steering structure which allows axle adjustments for varying wheel tread. Although the scissors structure functions well to keep the steering cylinder in plane during vertical motion of the strut shaft, such an assembly is relatively expensive and requires maintenance.

Another type of suspension system includes a steering cylinder attached at one end to the chassis and at the other end to the suspension. Although such a system can be simpler and less costly than the scissors assembly, the effective cylinder length will change with suspension travel causing undesirable changes in the steering angle and steering control problems. In systems wherein: the cylinder mounted to move vertically with the suspension, other problems can arise such as bracket complexity and cost, cylinder clearance and cylinder hose routing requirements, and added potential for cylinder and cylinder hose damage.

SUMMARY OF THE INVENTION

It is therefore an object of the present invention to provide an improved suspension for a high clearance vehicle such as a self-propelled agricultural sprayer. It is another object to provide such a suspension which overcomes most or all of the aforementioned problems.

It is a another object to provide an improved suspension for a high clearance vehicle which eliminates steering angle and steering control problems common with at least some of the previously available suspension systems. It is a further object to provide such a suspension which obviates need for scissors linkages or for steering cylinders that move vertically with the suspension. It is another object to provide such a suspension having a steering cylinder which is maintained generally in a consistent plane as the suspension moves over uneven terrain.

It is still another object to provide an improved suspension for a high clearance vehicle which has improved serviceability and reliability but yet is lower in cost than many previously available suspensions. It is a further object to provide such a suspension which is also more compact and lighter in weight than at least many previously available suspensions.

An independent strut suspension is described which utilizes upright twin spindles and a spindle cap linked to the spindles that translates vertically along the spindles as the suspension moves over uneven terrain. An upright strut shaft is mounted in a strut journal for axial and rotational movement with respect to the journal. A steering arm is connected for rotation about the strut shaft axis, and the strut shaft moves axially with respect to the steering arm. The upright spindles connect the steering arm and the upper mount, and a spring is supported between the upper end of the strut shaft and the upper mount and provides cushioning for the wheel support as the strut shaft moves axially in the journal. The spindle cap is rotationally fixed relative to the strut shaft and connected to the spindles for vertical movement with respect to the spindles as the strut shaft moves axially. The spindles and spindle bracket constrain the strut shaft for rotational movement with the steering arm for steering the wheel support while facilitating relative axial movement between the spindle bracket and the spindles.

The suspension eliminates scissors structures and moving cylinder supports. The torque load is carried through the spindles by allowing the suspension spindle cap casting to be linked to the spindles while still allowing the cap to translate axially along the steering spindles.

The suspension relatively light in weight and less complex and expensive than systems requiring scissors structures or steering cylinders that move with the suspension. Maintenance requirements are reduced, and the design is more compact and less subject to cylinder and hose damage. The steering cylinder can be attached at one end directly to the frame and is maintained in a plane to avoid unwanted effective cylinder length changes and steering control problems.

These and other objects, features and advantages of the present invention will become apparent in view of the drawings and the description which follows.

DESCRIPTION OF THE PREFERRED EMBODIMENT

Figure 1:
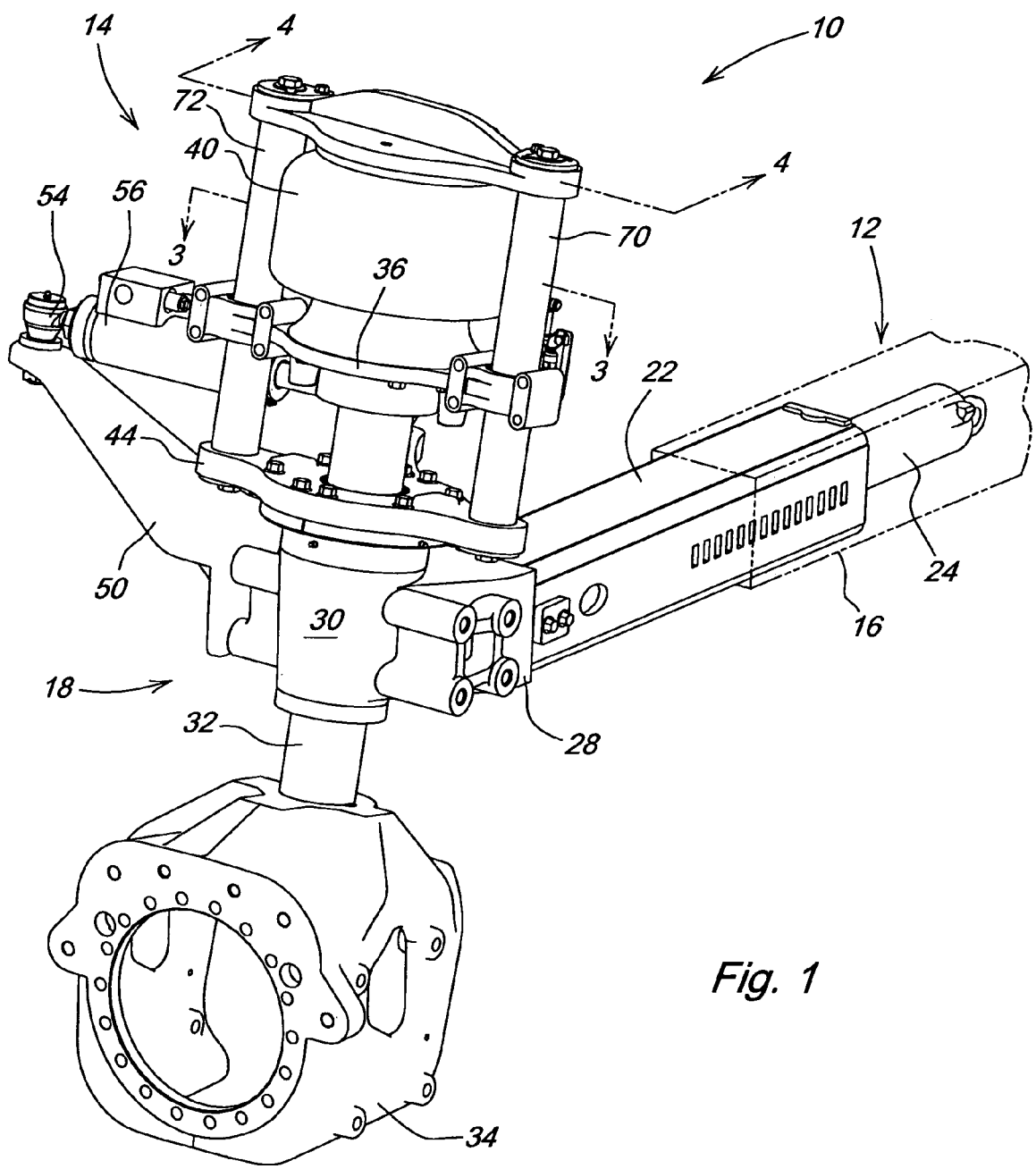
FIG. 1 is an outside perspective view of a portion of high clearance agricultural vehicle showing an independent strut suspension connected to the vehicle frame.
Figure 2:
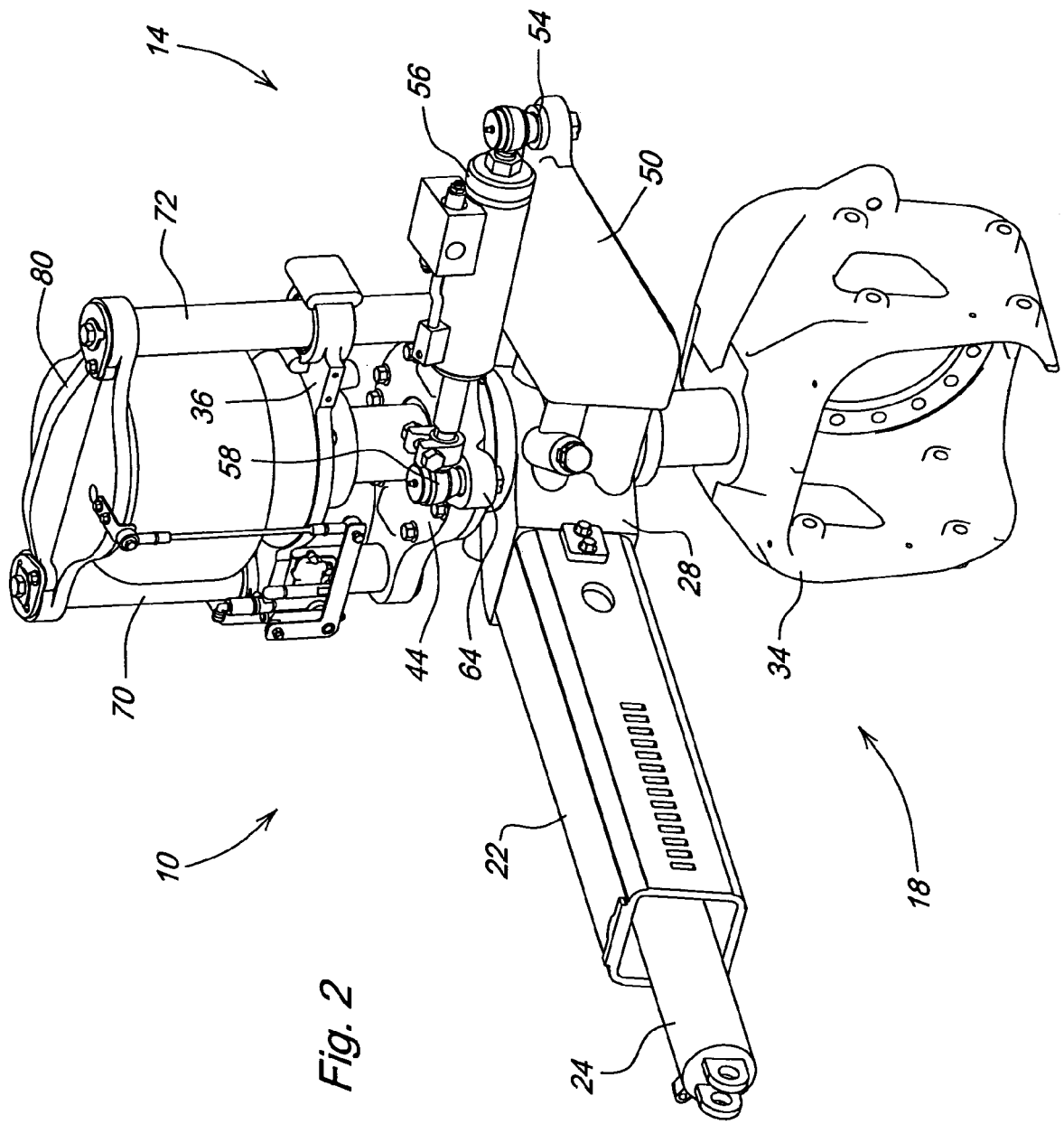
FIG. 2 is an inside perspective view of the suspension shown in FIG. 1.
Figure 3:
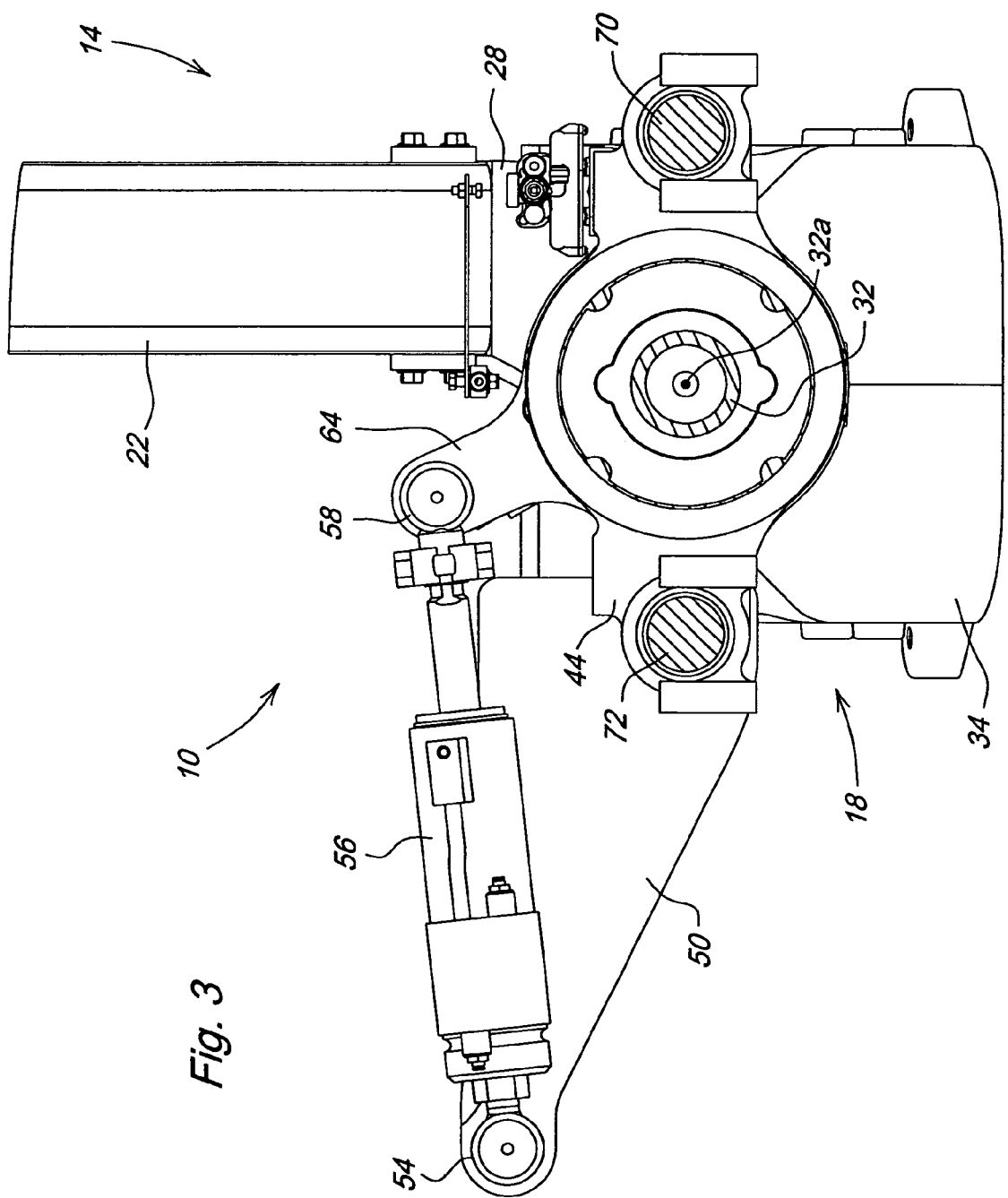
FIG. 3 is a top view, partially in section, of the suspension of FIG. 1.

Referring now to FIG. 1, therein is shown a portion of a high clearance agricultural vehicle 10 such as a self-propelled agricultural field sprayer 10 having a main frame 12. The sprayer may be generally of the type shown and described in the aforementioned U.S. Pat. No. 5,597,172.

Figure 4:
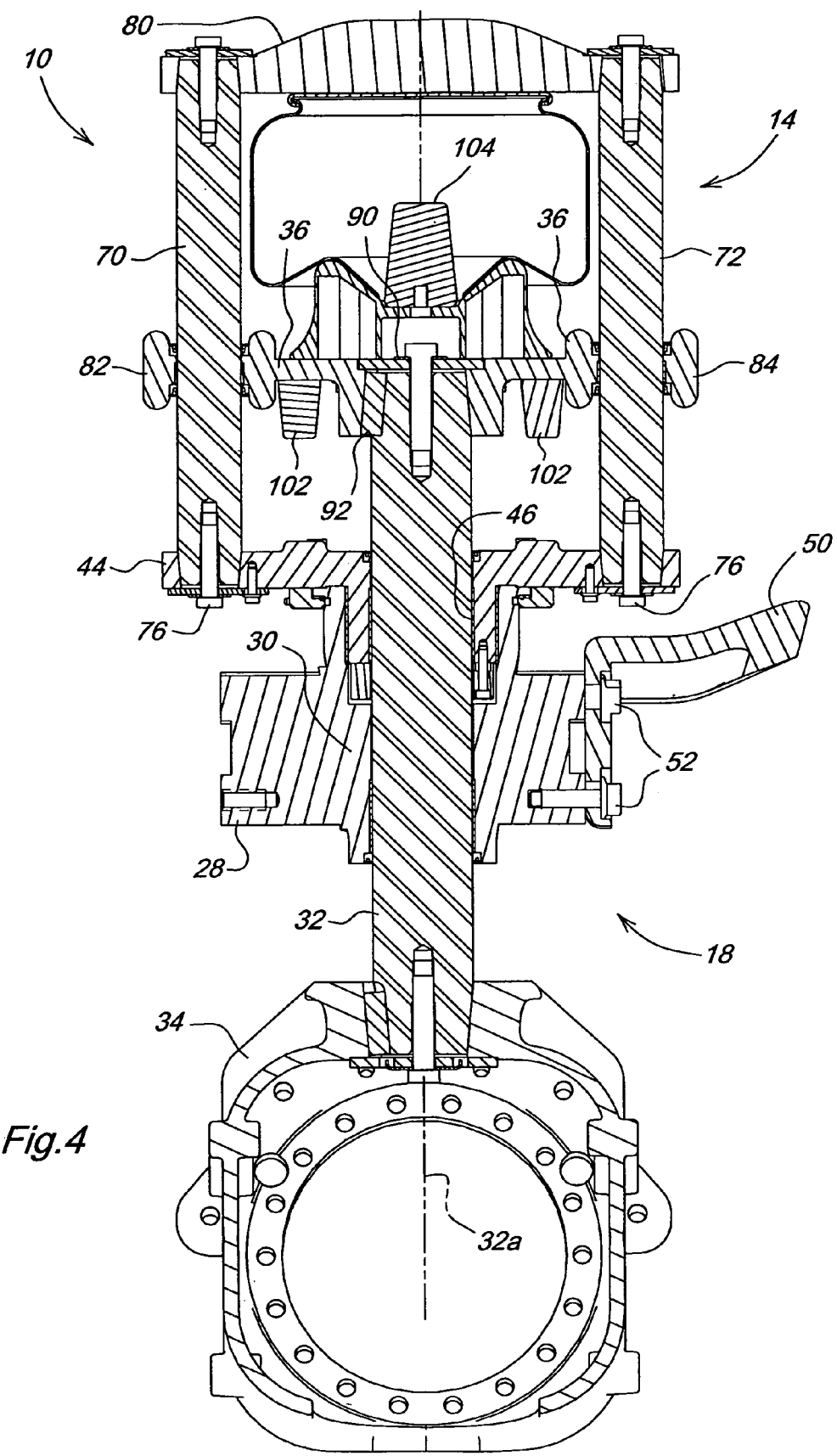
FIG. 4 is a sectional view of the suspension of FIG. 1.

Transversely adjustable wheel axle assemblies, one of which is shown at 14, are slidably received in tubular frame members 16 and support a steerable suspension assembly 18. The suspension assembly 18 includes a tube 22 having an inner end slidably received by the member 16. The tube 22 is connected to a hydraulic tread adjust cylinder 24 for adjusting the vehicle tread. A knee joint 28 is connected to the outermost end of the tube 22 and includes an upright journal area 30 slidably and rotatably mounting an upright strut shaft or suspension spindle 32 having a shaft axis 32a (FIG. 4). The lower end of the strut shaft 32 is fixed to a wheel support and motor housing 34 which carries a hydraulically driven and steerable ground engaging wheel (not shown). The upper end of the shaft 32 is fixed to an upper mount or spindle cap 36, and an airbag 40 or other spring type of device connected to the top of the upper mount 36 provides spring cushioning for the suspension spindle and housing 34.

A steering arm 44 is rotatably mounted at the journal area 30 in an enlarged bore 46 and slidably receives a central portion of the suspension spindle 32. The strut shaft 32 is free to move axially relative to the steering arm 44 so that the vertical position of the steering arm 44 remains constant relative to the knee joint 28. A steering cylinder arm 50 is fixed to the knee joint 28 by bolts 52 and extends in a fore-and-aft direction therefrom to a base end connection at 54 to a steering cylinder 56. The cylinder 56 extends from the base end connection at 54 to a rod end connection at 58 with a radially projecting steering member 64 on the steering arm 44.

The steering arm 44 supports the lower ends of first and second upright steering spindles 70 and 72 generally parallel to the axis 32*a* outwardly of the airbag 40. The spindles 70 and 72 are fixed to the steering arm 44 by bolts 76 (FIG. 4) and a taper lock and extend upwardly to a location above the airbag 40. An uppermost spindle spacer and spring support 80 is bolted to the tops of the spindles 70 and 72, and the airbag 40 is contained between the upper mount 36 and the support 80. The upper mount 36 includes guides or spindle bracket 82 and 84 slidably received over the outer circumference of the spindles 70 and 72 for constraining the upper mount 36 for rotation in unison with the steering arm 44. The upper end of the strut shaft 32 is connected to the upper mount 36 by a taper lock and a bolt and washer assembly 90 and is keyed at 92 for constraining the strut shaft 32 for rotation with the upper mount 36. Therefore, steering torque is transferred from the steering arm 44 through the spindles 70 and 72 and through the upper mount 36 to the strut shaft 32. As the steering cylinder 56 is extended and retracted, the strut shaft 32 will rotate in the journal area 30 about the axis 32*a* with the steering arm 44 to steer the housing 34 and attached drive wheel structure.

The steering spindles 70 and 72 thereby constrain the strut shaft 32 to maintain a constant angular relationship with the steering arm 44 while permitting the strut shaft 32 to move up and down in the journal area 30 and in the bore in the steering arm 44 to compress and relax the airbag 40 as the wheel structure moves over the surface of the ground or as the weight supported by the wheel structure changes. Bumpers 102 and 104 (FIG. 4) provide protection for the suspension at the extreme positions of the strut shaft 32.

Having described the preferred embodiment, it will become apparent that various modifications can be made without departing from the scope of the invention as defined in the accompanying claims.

The invention claimed is:

1. In an agricultural sprayer having a frame adapted for forward movement over uneven terrain, a suspension system comprising:
   an upright strut shaft having a strut shaft axis and upper and lower ends;
   an axle having a strut journal mounting the upright strut shaft for axial movement along the strut shaft axis and for rotational movement therein;
   a wheel support connected to the lower end of the strut shaft;
   a steering arm connected for rotation generally about the strut shaft axis, wherein the strut shaft moves axially in the direction of the strut shaft axis with respect to the steering arm as the frame moves over the uneven terrain;
   an upper spring support;
   first and second upright spindles connecting the steering arm and the upper spring support;
   a spring supported between the upper end of the strut shaft and the upper spring support and providing cushioning for the wheel support as the strut shaft moves axially in the journal; and
   a spindle bracket fixed to the strut shaft and connected to the spindles for vertical movement with respect to the spindles as the strut shaft moves axially, the spindles and spindle bracket constraining the strut shaft for rotational movement with the steering arm for steering the wheel support while facilitating relative axial movement in the direction of the strut shaft axis between the upper end of the strut shaft and the steering arm.

2. The suspension system as set forth in claim 1 including a steering cylinder having an effective cylinder length supported at one end from the axle and connected at an opposite end to the steering arm, wherein the steering arm maintains the steering cylinder in generally a constant vertical position as the strut shaft moves axially so that the effective cylinder length is unaffected by strut shaft movement in the direction of the strut shaft axis.

3. The suspension system as set forth in claim 1 wherein the steering arm is rotatably mounted in the strut journal.

4. The suspension system as set forth in claim 3 wherein the steering arm comprises a journal area extending into the strut journal.

5. The suspension system as set forth in claim 1 wherein the spring comprises an airbag compressed between the strut shaft and the upper spring support.

6. The suspension system as set forth in claim 1 wherein the upright spindles and strut shaft are parallel to each other.

7. In an agricultural implement having a frame adapted for forward movement over uneven terrain, a high clearance suspension system comprising:
   an upright strut shaft having a strut shaft axis and upper and lower ends;
   an axle having a strut journal mounting the upright strut shaft for axial movement along an upright strut shaft axis and for rotational movement therein;
   a wheel support connected to the lower end of the strut shaft;
   a steering arm connected to the journal mounting for rotation with respect thereto generally about the strut shaft axis, wherein the strut shaft moves axially in the direction of the upright strut shaft axis with respect to the steering arm as the frame moves over the uneven terrain, the steering arm remaining relatively fixed in the vertical direction with respect to the journal;
   an upper spring support;
   upright spindles connecting the steering arm and the upper spring support;
   a pneumatic spring supported between the upper end of the strut shaft and the upper spring support and providing cushioning for the wheel support as the strut shaft moves axially in the journal; and
   a spindle bracket fixed to the strut shaft and slidably received over the spindles for vertical movement with respect to the spindles and the steering arm as the strut shaft moves axially, the spindles and spindle bracket constraining the strut shaft for rotational movement with the steering arm for steering the wheel support while facilitating relative axial movement in the direction of the upright strut shaft axis between the spindle bracket and the spindles.

8. The suspension system as set forth in claim 7 including a steering cylinder having an effective cylinder length and supported at one end from the journal and connected at an opposite end to the steering arm, wherein the steering arm maintains the steering cylinder in generally a constant vertical position as the strut shaft moves axially in the direction of the upright strut shaft axis so that the effective cylinder length is unaffected by the axial strut shaft movement.

* * * * *